United States Patent
Wächter

(10) Patent No.: US 8,231,230 B2
(45) Date of Patent: Jul. 31, 2012

(54) IMAGE PROJECTION DEVICE

(75) Inventor: Gerrit Wächter, Jena (DE)

(73) Assignee: dilitronics GmbH, Jena (DE)

(*) Notice: Subject to any disclaimer, the term of this patent is extended or adjusted under 35 U.S.C. 154(b) by 252 days.

(21) Appl. No.: 12/309,621

(22) PCT Filed: Jul. 24, 2007

(86) PCT No.: PCT/EP2007/057611
§ 371 (c)(1),
(2), (4) Date: Aug. 14, 2009

(87) PCT Pub. No.: WO2008/012302
PCT Pub. Date: Jan. 31, 2008

(65) Prior Publication Data
US 2009/0303443 A1    Dec. 10, 2009

(30) Foreign Application Priority Data
Jul. 27, 2006  (DE) .......................... 10 2006 035 601

(51) Int. Cl.
*G03B 21/14* (2006.01)
*G05F 1/00* (2006.01)

(52) U.S. Cl. .............. 353/85; 353/94; 353/31; 362/231; 315/225; 315/291

(58) Field of Classification Search ................ 353/8, 20, 353/31, 33, 34, 37, 84, 94, 98, 99; 349/5, 349/7, 8, 9; 362/231
See application file for complete search history.

(56) References Cited

U.S. PATENT DOCUMENTS

| | | | |
|---|---|---|---|
| 5,278,542 A * | 1/1994 | Smith et al. ................. | 345/690 |
| 6,726,329 B2 | 4/2004 | Li et al. .......................... | 353/20 |
| 7,088,321 B1 * | 8/2006 | Parker ............................ | 345/83 |
| 7,347,557 B2 * | 3/2008 | De Smet ....................... | 353/20 |
| 2003/0133080 A1 | 7/2003 | Ogawa et al. ................. | 353/31 |
| 2004/0090601 A1 | 5/2004 | Nakanishi et al. ............ | 353/31 |
| 2004/0207823 A1 | 10/2004 | Alasaarela et al. ........... | 353/122 |

(Continued)

FOREIGN PATENT DOCUMENTS
DE    10254911    8/2003
(Continued)

*Primary Examiner* — William C Dowling
(74) *Attorney, Agent, or Firm* — Gerald T. Bodner

(57) ABSTRACT

The invention relates to an image projection device having a light source (1) from which light at a different wavelength originates sequentially, having an image modulation arrangement (4) and a projection surface (6) on which images are perceived visually. The invention also relates to a light source drive circuit (2) for an image projection device such as this. An image projection device of this type is provided, in which the image modulation arrangement (4) comprises a polarization beam splitter (11) and two reflective display areas (12.1, 12.2), each display area (12.1, 12.2) has an array of image reproduction elements which can be driven separately, by means of which the polarization direction of incident light is varied as a function of predetermined image information, the illumination beam path is first of all directed, for splitting purposes, into an s-polarized beam path element and a p-polarized beam path element towards the polarization beam splitter (11), the s-polarized beam path element is directed a the first display area (12.1) and the p-polarized beam path element is directed at the second display area (12.2), and the light which has been reflected from specific image reproduction elements in the display areas (12.1, 12.2) and whose polarization direction has been changed during the process is directed at the projection optics (5).

6 Claims, 2 Drawing Sheets

U.S. PATENT DOCUMENTS

Figure 1:
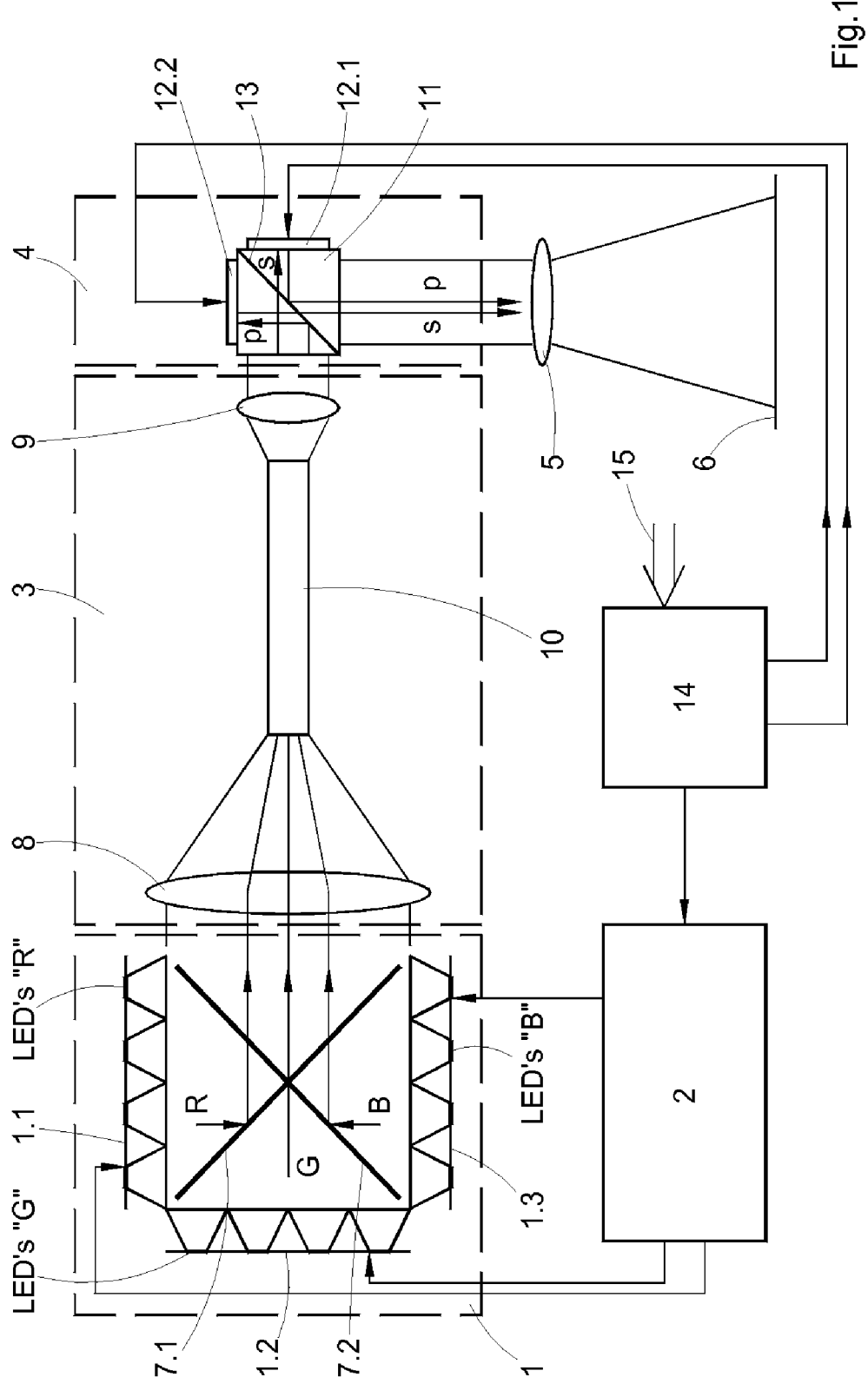

| | | | |
|---|---|---|---|
| 2005/0128441 A1* | 6/2005 | Morgan | 353/102 |
| 2006/0055896 A1* | 3/2006 | Matsui | 353/94 |
| 2006/0290625 A1* | 12/2006 | Sugimoto | 345/83 |
| 2009/0103155 A1* | 4/2009 | Shirai et al. | 359/196.1 |
| 2009/0231552 A1* | 9/2009 | Huber et al. | 353/85 |

FOREIGN PATENT DOCUMENTS

| | | |
|---|---|---|
| EP | 1389018 | 2/2004 |
| EP | 1647963 | 4/2006 |
| WO | WO 98/23990 | 6/1998 |

* cited by examiner

IMAGE PROJECTION DEVICE

The invention relates to an image projection device with a light source that is connected to a light source drive circuit and from which non-polarized, monochromatic light is emitted in at least two given wavelengths and also with a means for focusing this light onto an illumination beam path, with an image modulation arrangement through which image information is modulated onto the illumination beam path, and with projection optics by means of which the image-modulated illumination beam path is directed onto a projection surface on which the image information is displayed so that it can be perceived visually. The invention further relates to a light source drive circuit for an image projection device of the type described above.

Image projection devices with a light source that emits non-polarized, monochromatic light in several wavelengths and in which the emission of the light at different wavelengths is performed sequentially are known in the state of the art and are being applied increasingly in areas that are no longer used exclusively purely for entertainment, but instead also, for example, for displaying information on the windshield of vehicles (head-up display) or for rear projection in passenger compartments of passenger airplanes, ships, and the like.

Such an image projection device is described, for example, in DE 102 54 911 A1. The light source used here has a circuit board with a plurality of diodes emitting red, green, and blue light. A drive circuit is used to turn on the diodes that emit light of the same color simultaneously and the diodes that emit light of different colors sequentially, that is, one after the other in time. Further provided are a polarization beam splitter, a reflective display field on which image information is displayed, and a projection module that includes projection optics and a projection surface.

The different colors of the light emitted by the diodes are incident on the polarization beam splitter with time repetition one after the other and from there, as a function of the polarization device of the radiation portions, arrive at the display field through which image information is impressed on the light. The projection module presents the image information so that it can be perceived visually by a viewer.

The reflective display field is formed as an LCoS display. In principle, LCoS displays involve reflective LCD displays. The image-generating surface of an LCoS display is made from a liquid-crystal layer that is provided on the reverse side with a reflective aluminum layer. The liquid crystals form a plurality of surface-area regions, so-called pixels, with edge lengths of 8×8 µm to 20×20 µm. In the scope of the following description, these pixels are designated predominantly as image reproduction elements. An electrical voltage (in an actual case, an alternating voltage) can be applied by means of electrodes to each of these pixels separately. As a function of whether a voltage is applied to a pixel or not, the polarization direction of the light is rotated or not for its reflection on this pixel. The application of the voltage, that is, the driving of the pixels, influences the polarization device of the light with respect to each individual pixel. Indeed, the polarization direction of the light is rotated by 45° for each passage through the liquid crystal layer, so that, with the inlet into the display and the outlet from the display, a rotation of 90° is produced.

One significant disadvantage in the image projection device described in DE 102 54 911 A1 consists in that the light coming from the light source is not used efficiently, because only a sub-beam path with a first polarization plane arrives at the projection module, while the sub-beam path with the second polarization plane is deflected to an absorber and is thus lost for the image display.

Starting from these conditions, the invention is based on the problem of improving image projection devices of the type described above so that the light output is significantly increased compared with the solutions known in the state of the art.

This problem is solved according to the invention with an image projection device of this type in which
  the image modulation arrangement includes a polarization beam splitter and two reflective display fields,
  each of the display fields has an array made from image reproduction elements that can be driven separately, wherein
  image information is displayed with the driving of certain image reproduction elements and
  the polarization direction of incident and then reflected light is changed by the certain image reproduction elements,
  the still non-modulated illumination beam path is initially directed onto the polarization beam splitter for the purpose of splitting into an s-polarized sub-beam path and a p-polarized sub-beam path,
  the s-polarized sub-beam path emitted by the polarization beam splitter is directed onto the image reproduction elements of the first display field,
  the p-polarized sub-beam path emitted by the polarization beam splitter is directed onto the image reproduction elements of the second display field,
  the light that has been reflected by the certain image reproduction elements of the first display field and that has been changed in this way in its polarization direction and that is now p-polarized light is directed toward the projection optics, and
  the light that has been reflected by the certain image reproduction elements of the second display field and that has been changed in this way in its polarization direction and that is now s-polarized light is also directed toward the projection optics.

The reflective display fields are advantageously constructed as LCoS displays. In principle, however, DLP displays can also be provided as image-producing elements.

In one advantageous configuration of the invention, the light source includes several light source modules, wherein each light source module emits monochromatic light of a given wavelength. Beam coupling optics ensure that the light emitted by the individual light source modules is bundled into a beam path designated below as the illumination beam path.

Advantageously, three light source modules are provided, wherein each of the light source modules emits monochromatic light of one wavelength. Each of these wavelengths corresponds to a primary color. In this way, for example, a light source module can be provided that emits light of the primary color red, a light source module that emits light of the primary color green, and a third light source module that emits light of the primary color blue.

Obviously, it also lies in the scope of the invention to provide light source modules that emit light that is different from the mentioned three primary colors red, green, blue or also to provide light sources with light source modules for emitting light in more than three primary colors.

An embodiment of the invention in which the beam coupling optics have two dichroic mirrors has proven especially advantageous, wherein
  a first dichroic mirror is formed so that it reflects the light of the primary color red and transmits the light of the primary color green, the second dichroic mirror is formed so that it reflects the light of the primary color blue and transmits the light of the primary color green, and the dichroic mirrors are arranged in relation to the light source modules to that the light of the primary colors red and blue coming from the light source modules is reflected toward the beam-shaping device, while the light of the primary color green coming from the light source module passes both dichroic mirrors and arrives at the beam-shaping device.

The beam-shaping device can advantageously consist of focusing optics that are arranged within the beam-shaping device facing the light source, a collimator that is arranged facing the image modulation arrangement, and a light tunnel arranged between the focusing optics and the collimator.

The light tunnel can be formed as an optical waveguide with metal coating on the inside, for example, as a hollow waveguide with square cross section, as an optical fiber cable, or also as a bundle of optical fiber cables.

The light source drive circuit is formed for repeated, sequential driving of the light source modules, so that light of the wavelengths emitted by the individual light source modules arrives at the two display fields sequentially in a given cycle.

In an especially advantageous way, each of the light source modules has a plurality of light-emitting diodes, designated below, for short, as LEDs, emit the light of the correspondingly desired wavelength, in the preferred case of the wavelengths of red, green, and blue. In the scope of the invention, the term LED is used as a synonym both for the term "light-emitting diode" and also for the general term "semiconductor light source."

According to the invention, the light source drive circuit is formed according to the principle of pulse-width modulation, wherein the driving of individual LEDs is performed as a function of the integration of the optical power output by the light source.

In an especially advantageous way, each LED is coupled to a switch that is assigned to it and that can be controlled electronically with respect to the activation period of the assigned LED and wherein the switch is connected to a drive circuit through which the activation period is given as a function of the optical energy emitted by the relevant LED during the activation time as an equivalent for the optical power specified here.

In this respect, the problem forming the basis of the invention is solved with a method for generating light of a given wavelength in which semiconductor light sources $HL_n$ that emit light in n different primary colors $GF_k$ (k=1 ... n; n>2) are activated sequentially each for a given time period t, wherein the semiconductor light sources $HL_n$ are supplied with a constant electrical voltage U and an electric current that is equivalent to the optical energy to be emitted by the semiconductor light sources $HL_n$ during the time period t.

Advantageously, in this way semiconductor light sources $HL_1$ can emit light of a first primary color $GF_k$ (k=1), semiconductor light sources $HL_2$ can emit light of a second primary color $GF_k$ (k=2), and semiconductor light sources $HL_3$ emit light of a third primary color $GF_k$ (k=3).

In an especially preferred method, the semiconductor light sources $HL_1$ emit light of the primary color $GF_k$ (k=1) red, the semiconductor light sources $HL_2$ emit light of the primary color $GF_k$ (k=2) green, and the semiconductor light sources $HL_3$ emit light of the primary color $GF_k$ (k=3); each switching sequence through the primary colors red, green, and blue is shorter than the switching sequence that the human eye can detect, so that a color impression that corresponds to a mixture of primary colors is produced for the human eye as a function of the electric current applied to each of the semiconductor light sources $HL_n$.

Figure 2:
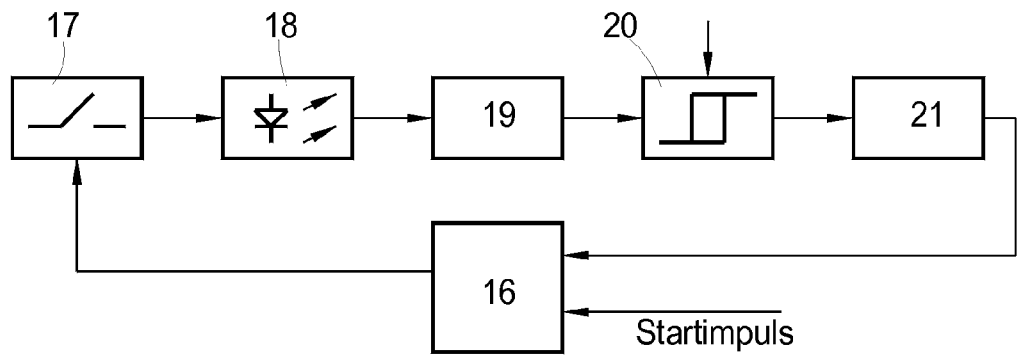
Figure 3:
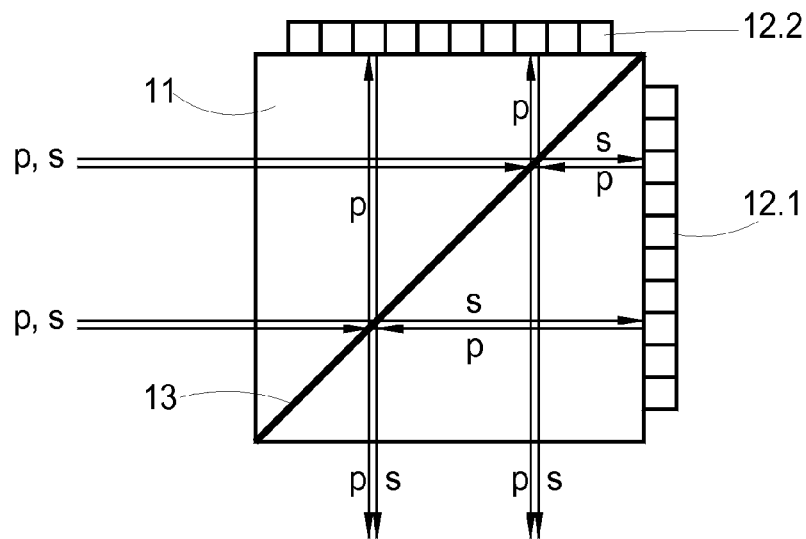
Figure 4:
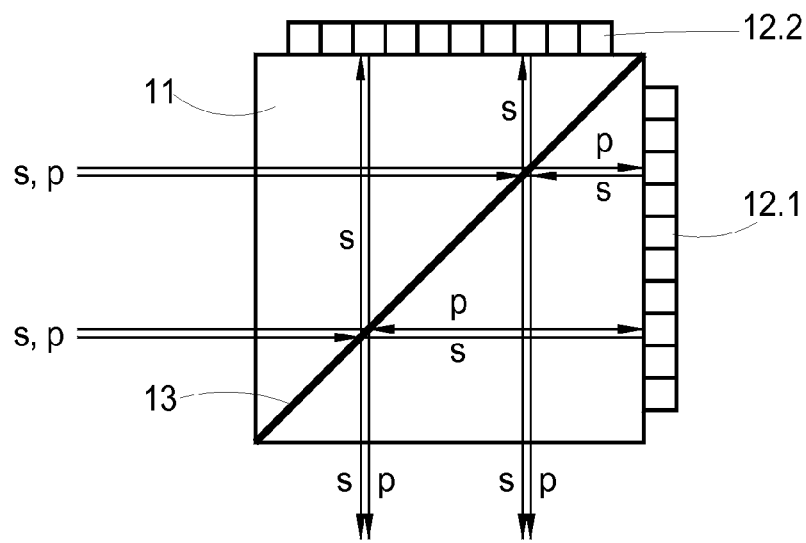

The invention shall be explained in greater detail below with reference to embodiments. Shown in the associated drawings are:

FIG. 1, the principle construction of the image projection device,

FIG. 2, a block circuit diagram of the light source drive circuit according to the invention, FIG. 3, a first variant of the construction of the image modulation arrangement, FIG. 4, a second variant of the construction of the image modulation arrangement.

In the principle diagram of the image projection device according to the invention from FIG. 1, a light source 1 and a light source drive circuit 2 connected to the light source 1 can be seen. In the beam path of the light emitted by the light source, a beam-shaping device 3, an image modulation arrangement 4, projection optics 5, and a projection surface 6 are arranged after the light source 1.

The light source 1 includes three light source modules 1.1, 1.2, and 1.3. Each of the light source modules 1.1, 1.2, and 1.3 has an array of LEDs arranged in rows and columns that emit light of a certain wavelength for driving by the light source drive circuit 2. For example, the light source module 1.1 is made from "R" LEDs that emit only light of the primary color red, the light source module 1.2 is made from "G" LEDs that emit only light of the primary color green, and the light source module 1.3 is made from "B" LEDs that emit only light of the primary color blue.

In addition, the light source 1 has two dichroic mirrors 7.1 and 7.2. The dichroic mirror 7.1 is formed so that it reflects light of the primary color red and transmits light of the primary color green, while the dichroic mirror 7.2 is formed so that it reflects light of the primary color blue and transmits light of the primary color green.

The dichroic mirror 7.1 is arranged relative to the light source module 1.1 so that the light that is emitted by the light source module 1.1 and thus by the "R" LEDs and that has a beam path indicated with R in FIG. 1 is reflected toward the beam-shaping device 3. Analogously, the dichroic mirror 7.2 is arranged relative to the light source module 1.3 so that the light emitted by the light source module 1.3 or by the "B" LEDs is also deflected in the direction toward the beam-shaping device 3. This beam path is designated in FIG. 1 symbolically by B. The two dichroic mirrors 7.1 and 7.2 are arranged so that the light coming from the light source module 1.3 or emitted by the "G" LEDs (designated by G in FIG. 1) passes through both dichroic mirrors 7.1 and 7.2 and arrives at the beam-shaping device 3.

It should be noted explicitly that of the "R", "G", "B" LEDs, only the one row-shaped series that extends in the plane of the drawing is visible in FIG. 1. Additional rows lie in parallel above or below the plane of the drawing or the columns in which the LEDs are arranged extend in the vertical direction relative to the plane of the drawing, so that each light source module 1.1, 1.2, and 1.3 is made from an array of LEDs arranged in rows and columns.

As is further visible from FIG. 1, the beam-shaping device 3 is made from focusing optics 8 that assume, within the beam-shaping device 3, a position facing the light source 1, from a collimator 9 that is arranged within the beam-shaping unit 3 facing the image modulation arrangement 4, and from a light tunnel 10 that is arranged between the focusing optics 8 and the collimator 9. Here, the light tunnel 10 can be formed advantageously as an optical waveguide with metal coating on the inside.

The image modulation arrangement 4 includes a polarization beam splitter 11 and also, according to the invention, two reflective display fields 12.1 and 12.2. Both display fields are formed here, for example, as LCoS displays. LCoS displays with up to 2048×1536 pixels (designated as image reproduction elements in the scope of the element) that have edge lengths of 8×8 to 20×20 μm are available and suitable.

Each of the display fields 12.1 and 12.2 has an array made from image reproduction elements that are arranged in rows and columns and that can be driven separately. With the drive of certain image reproduction elements to be selected as a function of the image information to be displayed, this image information can be impressed or modulated onto the illumination beam path, as will be explained in greater detail farther below.

The polarization beam splitter 11 has a splitter layer 13 that, according to the structural configuration, can either pass s-polarized light and reflect p-polarized light or conversely pass p-polarized light and reflect s-polarized light.

The splitter layer 13 is positioned with respect to the two display fields 12.1 and 12.2 and also with respect to the collimator 9 so that the portion of the light coming from the collimator 9 passing through the splitter layer 13 arrives at the display field 12.1 and the light reflected by the display field 12.1 is deflected from the splitter layer 13 toward the projection optics 5, while the portion of the light coming from the collimator 9 reflected by the splitter layer 13 is directed toward the display field 12.2 and the light reflected by the display field 12.2 also arrives at the projection optics 5 through the splitter layer 13.

The light output from the image modulation arrangement 4 and now modulated with image information and incident into the projection optics 5 is projected by the projection optics 5 onto the projection surface 6, so that the image information is displayed there so that it can be perceived visually.

The principle configuration of the projection optics 5 is known from the state of the art, for example, from US 2003/0133080 A1 and therefore does not have to be explained in greater detail at this point. The same applies to the projection surface 6. In the simplest case, this can be a white wall surface.

As is further visible from FIG. 1, an image setting and drive circuit 14 is provided that has outputs connected both to the light source drive circuit 2 and also to the display fields 12.1 and 12.2. The image setting and drive circuit 14 is equipped with an interface 15 that is shown symbolically in FIG. 1 and by means of which the images or image sequences to be displayed on the projection surface 6 can be set by a user of this image projection device. In this way, this configuration can involve both dynamic (moving) and also static (still) representations of objects or scenes.

In FIG. 2, the principle of the light source drive circuit 2 according to the invention is shown. According to this principle, the light source drive circuit 2 includes an RS flip-flop 16 that generates a switching voltage for a switch 17. This switching voltage is applied to the control input of the switch 17. With the switching voltage, the current supply for the LEDs 18 running across the switch 17 is turned on and off. Here, this configuration can involve a plurality of LEDs 18 that emit, for example, red light.

An integrator 19, a comparator 20 that has an input for a reference voltage, and also a D flip-flop 21 that has an output connected to a control input of the RS flip-flop 16 are arranged after the LEDs 18 in the block circuit diagram in FIG. 2. The comparator 20 can be, for example, a trigger.

The comparator 20 compares the integrated voltage value coming from the signal output of the integrator 19 with the reference voltage and as a result of this comparison transmits a signal to the D flip-flop 21 that is used for synchronization of this comparator signal with a system clock set, for example, by the image setting and drive circuit 14 (not shown in FIG. 2).

The synchronized comparator signal is then applied to the RS flip-flop 16, whereupon the switching voltage for the switch 17 is output by the RS flip-flop 16 for a given time period t, so that the LEDs 18 are provided with current for this time period t and emit light.

The function of the image projection device according to the invention will be described below.

After the image or an image sequence to be displayed has been set by the operator of the image projection device by means of the interface 15 (cf. FIG. 1), a start signal is triggered also by hand by means of the interface 15 by means of the image setting and drive circuit 14 in which a clock generator for the system clock is advantageously also present. This start signal ensures that, in the light source drive circuit 2, by means of the RS flip flop 16 (cf. FIG. 2), switching voltage for the switch 17 is generated, so that the LEDs 18 are provided with current for the provided time period t and emit light (for example) of the primary color red.

The current flowing through the LEDs 18 is converted by means of a not-shown current-voltage converter, for example, an electrical resistor or a current shunt, into a voltage equivalent to the current and from this voltage an integrated voltage value is obtained by means of the integrator 19. In the comparator 20, the integrated voltage value is compared continuously with the reference voltage and as soon as the rising, integrated voltage value has reached the reference voltage, a signal is output by the comparator 20 that ensures the interruption of the switching voltage for the switch 17 after synchronization with the system clock in the D flip-flop 21 by means of the RS flip-flop 16.

Analogously, as described here with reference to LEDs that emit light of the primary color red, circuits for driving LEDs are provided that generate light of the primary colors green and blue.

Thus, after generating the light of the primary color red, the switches that are coupled to "G" LEDs for generating the primary color green are driven and then the switches that are provided with "B" LEDs for emitting light of the primary color blue are driven.

Then in the way already described, the switch 17 is, in turn, driven and, in turn, light of the primary color red is generated. This switching sequence through the primary colors red, green, and blue is shorter than the switching sequence that the human eye can detect, so that a flicker-free image is produced on the projection surface 6.

According to the invention—in contrast to the state of the art—light of the three primary colors red, green, and blue is generated by means of the circuit arrangement described in FIG. 2 under the basis of the integration of the power output from each of the light sources. Therefore it is not necessary to keep the electric current constant that flows through the semiconductor light sources. Only the voltage is evaluated and the activation and deactivation of the light source modules is controlled with reference to the increase in the voltage.

As can be seen from FIG. 1, the light emitted by the "R" LEDs is incident on the dichroic mirror 7.1, is reflected by this mirror, and arrives at the focusing optics 8. The light emitted by the "G" LEDs passes both the dichroic mirror 7.1 and also the dichroic mirror 7.2 and likewise arrives at the focusing optics 8. The blue light emitted by the "B" LEDs is incident on the dichroic mirror 7.2 and is likewise reflected by this to the focusing optics 8.

By means of the focusing optics 8, the light is bundled and coupled into the light tunnel 10 arranged after the focusing optics 8. Due to the spontaneous multiple reflection of the radiation portions on the tunnel inner wall, the intensity of the radiation in the radiation cross section is homogenized. The collimator 9 images the output area of the light tunnel 10 onto the downstream display fields 12.1 and 12.2, wherein the polarization beam splitter 11 is included in the manner already described above.

As already described, for example, LCoS displays are used as the display fields 12.1 and 12.2.

Each of the display fields 12.1 and 12.2 is made from an array of image reproduction elements that are arranged in rows and columns and that can be driven separately and of which certain image reproduction elements selected as a function of an image to be displayed are driven, wherein, with the driving, an electrical voltage is placed on the electrodes of the relevant image reproduction element.

If a voltage is applied to the electrodes of an image reproduction element, the polarization direction of the incident light that is then reflected by this image reproduction element is rotated. Thus, if s-polarized light enters into the display field 12.1 or 12.2, p-polarized light comes back from the image reproduction elements supplied with voltage. From the image reproduction elements not supplied with voltage, the light comes back unchanged with respect to polarization direction, that is, s-polarized. And conversely: if p-polarized light is incident, s-polarized light comes back from the image reproduction elements supplied with voltage and p-polarized light comes back from the image reproduction elements not supplied with voltage.

If light of the primary color red is emitted from the light source 1 at time period t, it is directed according to the cross-sectional form of the outlet surface of the light tunnel 10 by means of the collimator 9 planar onto the splitter layer 13 of the polarization beam splitter 11.

In this way, as shown in FIG. 3, s-polarized light passes through the splitter layer 13 and is incident on the display field 12.1. Here, the surface illuminated on the display field 12.1 corresponds in width and height proportionally to the size of the image to be displayed on the projection surface 6. Image reproduction elements located in this surface area on the display field 12.1 are illuminated with s-polarized light. P-polarized light comes back from the image reproduction elements that are driven as a function of the image to be displayed on the projection surface 6 or that have electrodes on which a voltage is applied, is incident again on the splitter layer 13, and is deflected by this toward the projection optics 5.

The light reflected from the non-driven image reproduction elements of the display field 12.1 is not p-polarized, and therefore passes the splitter layer 13 and does not arrive at the projection optics 5.

In contrast, the p-polarized radiation portion of the light coming from the collimator 9 and incident on the splitter layer 13 is reflected by the splitter layer 13 and is deflected due to the 45° inclination of the splitter layer 13 relative to the radiation direction toward the display field 12.2. Also here, the surface area illuminated on the display field 12.2 corresponds in width and height proportionally to the size of the image to be displayed on the projection surface 6. All of the image reproduction elements located in this surface area on the display field 12.2 are illuminated with p-polarized light.

S-polarized light comes back from the image reproduction elements that are driven as a function of the image information to be displayed on the projection surface 6 or that have electrodes on which a voltage is applied, passes the splitter layer 13, and arrives at the projection optics 5.

The light reflected by the non-driven image reproduction elements of the display field 12.2 is not s-polarized, and is therefore deflected at the splitter layer 13 and does not arrive at the projection optics 5.

The s-polarized and p-polarized radiation portions that are incident modulated with the image information in the projection optics 5 are projected by means of the projection optics 5 onto the projection surface 6, so that the image to be displayed or an image sequence to be displayed can be perceived visually on the projection surface 6.

The projection optics 5 are made from optical lenses with spherical or aspherical light inlet and outlet surfaces. They collect the light coming from the display fields 12.1 and 12.2 or from the polarization beam splitter 11 and forward it to the projection surface 6, wherein the image reproduction elements of both display fields 12.1 and 12.2 are imaged enlarged onto the projection surface 6.

According to the invention, in the described way, both the s-polarized radiation portion and also the p-polarized radiation portion are used for displaying the image on the projection surface 6 by means of the two display fields 12.1 and 12.2. Therefore, in contrast to the state of the art, in which only one display field is used, the light output is significantly higher, so that, with the invention, light sources can be used more effectively or can be operated with less power and lower energy consumption. This has significant advantages with respect to the structural size of the image projection device and accommodates efforts toward miniaturization.

In the case described here as an example in which the illumination light is emitted by LEDs, a multiplication of the light output by a factor of 2 is achieved, because LEDs emit randomly polarized light and the light emitted by the LEDs is distributed to the same parts on the two displays.

FIG. 4 shows a second variant of the polarization beam splitter 11, wherein here the splitter layer 13 is formed so that p-polarized light is transmitted and s-polarized light is reflected on the splitter layer. Therefore, initially s-polarized light is incident on the display field 12.1 and returns from there—modulated with image information—as p-polarized light. At the same time, s-polarized light is incident on the display field 12.2 and returns from there as p-polarized light provided with the same image modulation. After passing the polarization beam splitter 11, the radiation portions of the two polarization directions are also joined again here.

In both cases, both according to FIG. 3 and also according to FIG. 4, it is necessary to adjust the display fields 12.1 and 12.2 relative to each other so that within the illumination beam path the positions of the image reproduction elements on the display field 12.1 correspond to the positions of the image reproduction elements on the display field 12.2, so that the light reflected from a given position on the display field 12.1 is incident at the same position on the projection surface 6 like the light reflected from the equivalent position on the display 12.2.

This adjustment can be performed manually or with the aid of microscopes, wherein, after the adjustment, the two display fields 12.1 and 12.2 can be adhered with the outer surfaces of the polarization beam splitter 11, so that a later shift in position is no longer possible.

LIST OF REFERENCE SYMBOLS

1 Light source
1.1, 1.2, 1.3 Light source modules

2 Light source drive circuit
3 Beam-shaping device
4 Image modulation arrangement
5 Projection optics
6 Projection surface
7.1; 7.2 Dichroic mirrors
8 Focusing optics
9 Collimator
10 Light tunnel
11 Polarization beam splitter
12.1, 12.2 Display fields
13 Splitter layer
14 Image setting and drive circuit
15 Interface
16 RS flip-flop
17 Switch
18 Semiconductor light sources (LED)
19 Integrator
20 Comparator
21 D flip-flop
LEDs "R", "G", "B" Light-emitting diodes

The invention claimed is:

1. Method for generating light of a given wavelength for an image projection device, in which LED semiconductor light sources ($HL_n$) that emit light in n different primary colors ($GF_k$) (k=1...n; n>2) are activated sequentially each for a given time period (t), wherein the LED semiconductor light sources ($HL_n$) are supplied with a constant electrical voltage (U) and an electric current (I), characterized in that the current flowing through the LED semiconductor light sources ($HL_n$) is controlled by at least one switch (17), the at least one switch (17) receiving a switching voltage which controls activation of the at least one switch (17), the switching voltage being synchronized with a clock signal generated by a system clock, wherein the current flowing through the LED semiconductor light sources ($HL_n$) is further converted into a voltage equivalent to the current and is supplied to an integrator which generates an integrated voltage value, and wherein the integrated voltage value is compared with a reference voltage, and when the reference voltage is reached by the integrated voltage value, the switching voltage of the at least one switch (17) is interrupted after synchronization with the system clock, resulting in an interruption of the current supplied to the LED semiconductor light sources ($HL_n$) so that the current is equivalent to the optical energy to be emitted from the LED semiconductor light sources ($HL_n$) during the time period (t), with the flowing current not being kept constant and a pulse-width modulation being carried out, wherein the driving of the individual LED semiconductor light sources is performed as a function of the integration of the optical energy output by the light sources.

2. Method according to claim 1, characterized in that

LED semiconductor light sources ($HL_1$) emit light of a first primary color ($GF_k$) (k=1), LED semiconductor light sources ($HL_2$) emit light of a second primary color ($GF_k$) (k=2) and LED semiconductor light sources ($HL_3$) emit light of a third primary color ($GF_k$) (k=3).

3. Method according to claim 2, characterized in that the LED semiconductor light sources ($HL_1$) emit light of the primary color red, the LED semiconductor light sources ($HL_2$) emit light of the primary color green, and the LED semiconductor light sources ($HL_3$) emit light of the primary color blue.

4. Method according to claim 1, characterized in that each switching sequence through the primary colors ($GF_k$) is shorter than the switching sequence that the human eye can detect, so that, as a function of the electric current given for the LED semiconductor light sources ($HL_n$), a color impression that corresponds to a mixture from the primary colors ($GF_k$) is produced for the human eye.

5. Light source drive circuit for carrying out the method according to claim 1, comprising:

the at least one switch (17) that is connected to LED diodes (18) emitting light of the primary color red, light of the primary color green, or light of the primary color blue, wherein the at least one switch includes a control input for the application of the switching voltage, a voltage source that is used for supplying current to the diodes (18) and that is connected by means of the at least one switch (17) to the diodes (18) when a switching voltage is applied to the control input of the at least one switch (17), an RS flip-flop (16) that is connected to the control input of the at least one switch (17), from which the switching voltage is output for a given time period (t), a current-voltage converter that converts the current flowing through the diodes (18) into a voltage equivalent to the current, an integrator (19) for integrating this voltage, a comparator (20) that compares the voltage rising after the activation of the diodes (18) with the reference voltage and generates a comparator signal in response thereto, the comparator signal interrupting the switching voltage by the RS flip-flop (16) when the reference voltage is reached by the integrated voltage value.

6. Light source drive circuit according to claim 5, characterized in that a D flip-flop (21) is provided between the integrator (19) and the RS flip-flop (16) for synchronizing the comparator signal with the clock signal generated by the system clock.

* * * * *